(12) United States Patent
Ishizaka et al.

(10) Patent No.: US 10,348,587 B2
(45) Date of Patent: Jul. 9, 2019

(54) EQUIPMENT MANAGEMENT SYSTEM AND PROGRAM

(75) Inventors: Taichi Ishizaka, Tokyo (JP); Shigeki Suzuki, Tokyo (JP); Takahiro Ito, Tokyo (JP); Noriyuki Komiya, Tokyo (JP); Takeru Kuroiwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 270 days.

(21) Appl. No.: 14/405,168

(22) PCT Filed: Jun. 26, 2012

(86) PCT No.: PCT/JP2012/066248
§ 371 (c)(1),
(2), (4) Date: Dec. 3, 2014

(87) PCT Pub. No.: WO2014/002184
PCT Pub. Date: Jan. 3, 2014

(65) Prior Publication Data
US 2015/0134814 A1    May 14, 2015

(51) Int. Cl.
*G06F 12/00* (2006.01)
*G06F 15/16* (2006.01)
(Continued)

(52) U.S. Cl.
CPC ......... *H04L 43/08* (2013.01); *G06Q 10/0639* (2013.01); *G06F 11/3013* (2013.01);
(Continued)

(58) Field of Classification Search
CPC .............. G06Q 10/0031; H04L 43/045; H04L 43/0817
See application file for complete search history.

(56) References Cited

U.S. PATENT DOCUMENTS

| | | | | |
|---|---|---|---|---|
| 6,021,429 A | * | 2/2000 | Danknick | ......... H04L 29/12009 709/208 |
| 6,456,306 B1 | * | 9/2002 | Chin | ................... H04L 41/0213 709/224 |

(Continued)

FOREIGN PATENT DOCUMENTS

| CN | 101669078 A | 3/2010 |
|---|---|---|
| EP | 2 219 384 A1 | 8/2010 |

(Continued)

OTHER PUBLICATIONS

International Search Report of the International Searching Authority dated Sep. 18, 2012 for the corresponding international application No. PCT/JP2012/066248 (and English translation).

(Continued)

*Primary Examiner* — Nicholas R Taylor
*Assistant Examiner* — Ho T Shiu
(74) *Attorney, Agent, or Firm* — Posz Law Group, PLC

(57) ABSTRACT

An equipment manager manages connected equipment. A Web server is able to provide Web contents that include a monitoring program for monitoring the states of equipment managed by plural equipment management devices. A Web-contents-display controller acquires the Web contents that are transmitted from the Web server, executes the monitoring program, acquires an equipment-management-device-address list, uses the acquired equipment-management-device-address list to connect to each of the plural equipment management devices, acquires equipment data that is managed by each of the equipment management devices, and displays that equipment data on one screen of the Web browser.

11 Claims, 11 Drawing Sheets

(51) Int. Cl.
*H04L 12/24* (2006.01)
*H04L 12/26* (2006.01)
*G06Q 10/06* (2012.01)
*H04L 29/12* (2006.01)
*H04L 29/08* (2006.01)
*G06F 11/30* (2006.01)

(52) U.S. Cl.
CPC ...... *G06F 11/3055* (2013.01); *G06F 11/3065* (2013.01); *H04L 29/12009* (2013.01); *H04L 29/12047* (2013.01); *H04L 43/045* (2013.01); *H04L 67/28* (2013.01)

(56) References Cited

U.S. PATENT DOCUMENTS

| | | | | |
|---|---|---|---|---|
| 6,658,586 | B1 * | 12/2003 | Levi | B60R 25/04 714/4.3 |
| 6,973,491 | B1 * | 12/2005 | Staveley | H04L 41/0253 709/223 |
| 8,260,842 | B1 * | 9/2012 | Zaretzky | H04N 21/4424 709/202 |
| 2004/0083210 | A1 | 4/2004 | Ochiai et al. | |
| 2008/0010109 | A1 | 1/2008 | Ide | |
| 2009/0024724 | A1 * | 1/2009 | Hirai | H04L 29/12254 709/223 |
| 2010/0121465 | A1 | 5/2010 | Kanbara et al. | |
| 2010/0169298 | A1 * | 7/2010 | Ge | G06F 17/30864 707/707 |
| 2010/0262467 | A1 * | 10/2010 | Barnhill, Jr. | H04L 12/2809 709/223 |
| 2012/0144416 | A1 * | 6/2012 | Wetzer | H04N 21/25816 725/14 |
| 2012/0254411 | A1 * | 10/2012 | Ito | H04L 67/2847 709/224 |
| 2012/0265865 | A1 * | 10/2012 | Tanaka | H04L 41/044 709/223 |

FOREIGN PATENT DOCUMENTS

| | | |
|---|---|---|
| JP | 11-306068 A | 11/1999 |
| JP | 2001-084210 A | 3/2001 |
| JP | 2003-324778 A | 11/2003 |
| JP | 2009-237725 A | 10/2009 |
| JP | 4862600 B2 | 11/2011 |
| JP | 2012-118733 A | 6/2012 |

OTHER PUBLICATIONS

Extended European Search Report dated Apr. 20, 2016 issued in corresponding EP patent application No. 12879821.2.
Office Action dated May 7, 2015 in the corresponding JP application No. 2014-522267 (English translation included).
Office Action dated Aug. 4, 2015 in the corresponding JP application No. 2014-522267 (with English translation).
Kujirahikozukue, HTML5, Introduction to development of smartphone application software, Nikkei Software, Nikkei Business Publications, Inc., Jun. 24, 2012, vol. 15, Issue 8, pp. 98-103.
Zapa, a power supplying situation of Tokyo Electric Power Co., Inc. API, I/0, Kougaku Co., Inc., Jun. 1, 2011, vol. 36, Issue 6, pp. 124-126.
Office Action dated Jul. 1, 2016 issued in corresponding CN patent application No. 201280074306.0 (and partial English translation).
Office Action dated Feb. 16, 2017 issued in corresponding CN patent application No. 201280074306.0 (and partial English translation).
Office Action dated Aug. 2, 2017 issued in corresponding CN patent application No. 201280074306.0 (and partial English translation).
Office Action dated Nov. 15, 2017 issued in corresponding CN patent application No. 201280074306.0 (and English translation).
Office action dated Jul. 24, 2018 issued in corresponding EP patent application No. 12879821.2.

* cited by examiner

FIG.7

SCREEN IMAGE (UNIT ERROR SCREEN)

| MONITOR/OPERATION | | SCHEDULE | STATE LIST | |
|---|---|---|---|---|
| ERROR | FILTER | | | |
| | ADDRESS | NAME | ERROR CODE | DATE/TIME OF OCCURRENCE |
| 1 | 1-41 | 1F MEETING ROOM F | 6607 | 2012/1/3 09:25 — FROM EQUIPMENT MANAGEMENT DEVICE 3a |
| 2 | 2-32 | 2F RECEPTION ROOM | 6608 | 2012/1/3 09:21 — FROM EQUIPMENT MANAGEMENT DEVICE 3a |
| 3 | 5-01 | 5F COMPANY C, MATERIAL DEPARTMENT | 6601 | 2012/1/3 07:12 — FROM EQUIPMENT MANAGEMENT DEVICE 3b |
| 4 | 3-34 | 3F COMPANY A, SALES DEPARTMENT | 6607 | 2012/1/2 08:15 — FROM EQUIPMENT MANAGEMENT DEVICE 3c |
| 5 | 1-21 | 1F MEETING ROOM C | 6608 | 2012/1/2 08:12 — FROM EQUIPMENT MANAGEMENT DEVICE 3a |
| 6 | 1-15 | 1F MEETING ROOM B | 6608 | 2012/1/2 08:00 — FROM EQUIPMENT MANAGEMENT DEVICE 3a |

EQUIPMENT MANAGEMENT SYSTEM AND PROGRAM

CROSS REFERENCE TO RELATED APPLICATION

This application is a U.S. national stage application of International Patent Application No. PCT/JP2012/066248 filed on Jun. 26, 2012.

TECHNICAL FIELD

The present disclosure relates to an equipment management system and program.

BACKGROUND

Recently, equipment management devices for performing overall management of equipment such as air conditioners, lighting and the like that are installed in housing in a building or the like have appeared. Of these, there are equipment management devices that enable monitoring the state of equipment from the personal computer (PC) of a building manager. This kind of equipment management device comprises a Web server. A Web server generates Web pages for viewing information related to the state of the equipment. The generated Web pages are displayed on the screen of the PC by the Web browser of the PC. By viewing the Web pages it is possible to monitor the state of the equipment.

When plural equipment management devices are installed at the entrance of each floor of housing in a building, or when plural equipment management devices are installed for each building, Web pages are generated for each equipment management device. Therefore, in order to monitor equipment using the Web browser, it is necessary to open and view plural Web pages for each equipment management device.

However, when plural Web pages are open, it is sometimes difficult to know which Web page is for which building. Moreover, one Web page may be hidden by another Web page, which may cause management problems to occur, such as overlooking equipment for which trouble is occurring.

Therefore, a display device for a home equipment monitoring system that makes it possible to simultaneously display information of plural Web pages on the Web browser has been disclosed (for example, refer to Patent Literature 1). With this display device it is possible to simultaneously display center-side Web contents that are transmitted from a center device, and local-side Web contents that are transmitted from the controller on one screen of a display. As a result, comparing Web contents that are sent from the center device and Web contents sent from the controller becomes easy.

PATENT LITERATURE

[Patent Literature 1] Japanese Patent No. 4,862,600 (FIG. 7)

Technical Problem

In the display device that is disclosed in Patent Literature 1 above, the screen of the Web browser is divided into plural areas. Each area of the Web browser is assigned to each equipment management device, or in other words, the display of contents of one Web server. Therefore, due to resolution and size restrictions of the screen, there was a limit to the number of Web servers that provide Web contents (or in other words, the number of equipment management devices that can be displayed simultaneously). Moreover, due to the relationship of the screen layout, the number of Web contents displayed (number of divisions of the screen) is often fixed in advance.

For such reasons, it is difficult to use the technology disclosed in Patent Literature 1 in an equipment management system in which the number of equipment management devices changes according to the amount of building equipment and the system configuration.

SUMMARY

In consideration of the situation described above, it is the objective of the present disclosure to provide an equipment management system and program that can be used to monitor the state of equipment that is managed by plural equipment management devices on the screen of the same Web browser, even when an unspecified large number of equipment management devices are installed.

In order to accomplish the objective above, the equipment management system of the present disclosure is an equipment management system for managing equipment using plural equipment management devices, comprising:

equipment managers that are provided in each of the equipment management devices and that manage the connected equipment;

a Web server that is capable of providing Web contents that include a monitoring program for monitoring the state of the equipment managed by the plural equipment management devices;

address holders that are provided in each of the equipment management devices, and hold address information for the plural equipment management devices; and a Web browser that acquires the Web contents that are transmitted from the Web server, executes the monitoring program, acquires the address information that is held by the address holders, uses the acquired address information to connect to each of the plural equipment management devices, acquires information about the states of the equipment managed by each of the equipment management devices, and displays the information about the states of the equipment managed by the plural equipment management devices on one screen of the Web browser.

With the present disclosure, a Web browser executes a monitoring program that is included in Web contents that are read by the Web browser, and by doing so, acquires address information for each of plural equipment management devices, and then uses that address information to acquire the state of equipment managed by the equipment management devices. The Web browser executes the monitoring program, so that it is possible to display the acquired equipment data on the same screen of the Web browser as the same Web page. As a result, it is possible to monitor the states of the equipment managed by the plural equipment management devices on the same Web browser screen even when an unspecified large number of equipment management devices are installed.

BRIEF DESCRIPTION OF DRAWINGS

FIG. 7 is a drawing illustrating an example of a screen that displays a unit where trouble occurred;

DETAILED DESCRIPTION

Embodiments of the present disclosure will be explained in detail with reference to the drawings.

First Embodiment

First, a first embodiment of the present disclosure will be explained.

Figure 1:
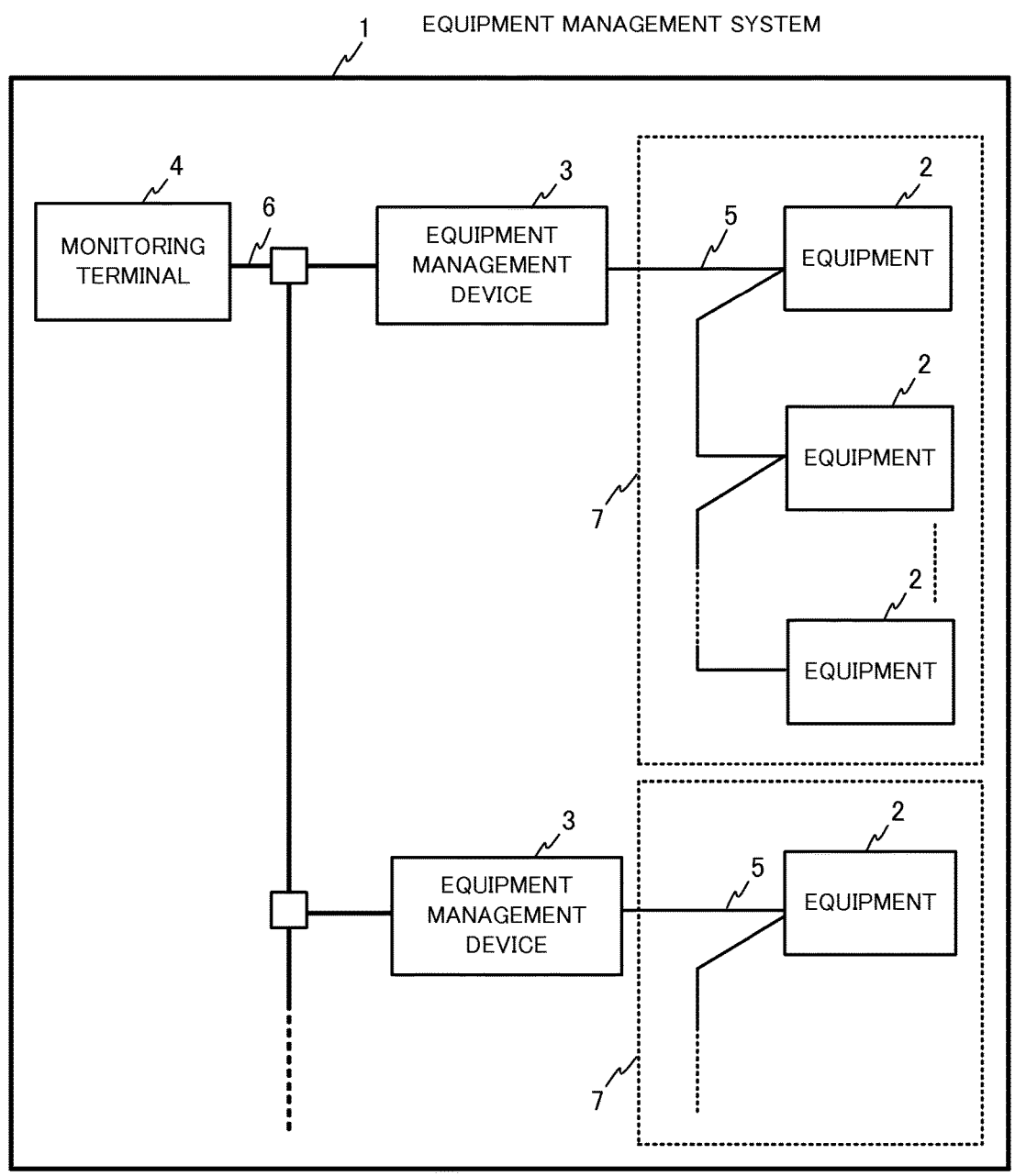
FIG. 1 is a block diagram illustrating the configuration of an equipment management system of a first embodiment of the present disclosure.

FIG. 1 illustrates the configuration of an equipment management system 1 of a first embodiment of the present disclosure. As illustrated in FIG. 1, the equipment management system 1 of this embodiment comprises: plural pieces of equipment 2, plural equipment management devices 3 and a monitoring terminal 4. The equipment management system 1 is a system that manages equipment 2 using plural equipment management devices 3.

Each piece of equipment 2 and the equipment management devices 3 are connected to be able to communicate with each other via dedicated communication lines 5. Moreover, the plural equipment management devices 3 and monitoring terminal 4 are connected by communication lines 6 so that communication with each other is possible.

It is not particularly illustrated in FIG. 1; however, the equipment 2 is presumed to be various kinds of devices that are installed in a building such as air-conditioners, lighting, hot-water heaters and the like. All of the plural equipment 2 is installed in specified locations inside housing in a building or the like. The equipment 2 operates under the control of equipment management devices 3. The equipment management devices 3 are notified of the states (for example, operating states) of the equipment 2 by way of the dedicated communication lines 5. A group of plural pieces of equipment 2 that are managed by the same equipment management device 3 is also hereafter called an equipment group 7.

Figure 2:
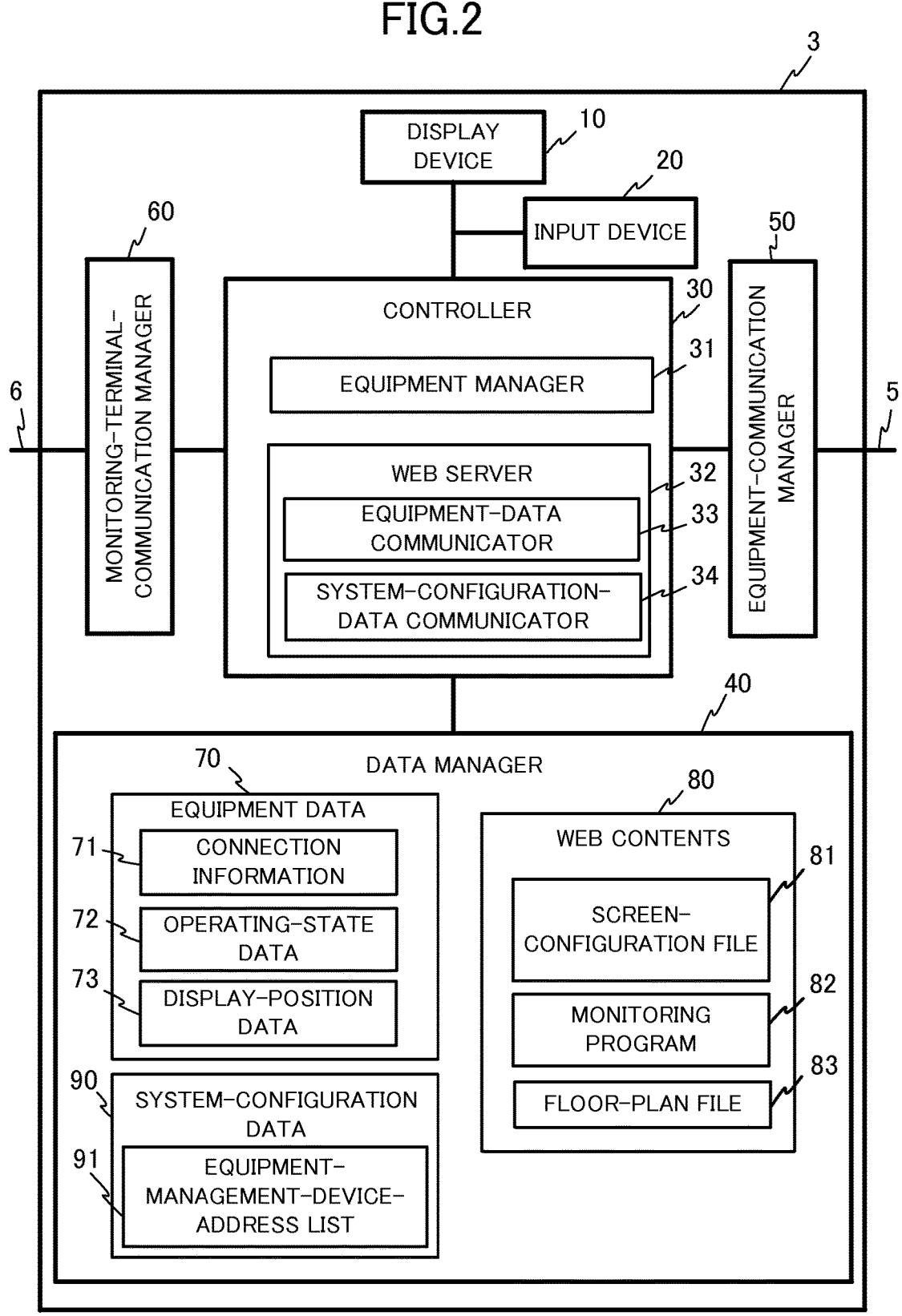
FIG. 2 is a block diagram illustrating the construction of an equipment management device of a first embodiment of the present disclosure.

First, the construction of an equipment management device 3 will be explained. FIG. 2 illustrates the construction of an equipment management device 3.

An equipment management device 3 performs overall management (monitoring, control) of plural pieces of equipment 2 that are connected together, or in other words, an equipment group 7. As illustrated in FIG. 2, an equipment management device 3 comprises a display device 10, an input device 20, a controller 30, a data manager 40, an equipment-communication manager 50 and a monitoring-terminal-communication manager 60.

The display device 10, under control of the controller 30, displays various screens for performing management of an equipment group 7.

The input device 20 is an input device such as a mouse, a keyboard, a touch panel and the like. When the input device 20 is a touch panel, the input device 20 is located on the display device 10. When an input device 20 such as a mouse or the like is operated by a manager, the screen can be switched according to the inputted contents, and it is possible to operate the connected equipment 2.

The controller 30 is a computer and comprises a CPU (Central Processing Unit), memory and a storage device (none of which is illustrated). By the CPU executing a program that is stored in the memory, all of the components of the controller 30 described below and the functions thereof can be achieved.

The controller 30 stores the state (for example, operating state) of equipment 2 in the data manager 40, and transmits data to and receives data from the monitoring terminal 4 that is required for the monitoring screen that is displayed on the monitoring terminal 4. The controller 30 comprises an equipment manager 31 and a Web server 32.

An equipment manager 31 is provided in each equipment management device 3, and manages the connected equipment 2. More specifically, the equipment manager 31 monitors and controls the state of the equipment 2. In other words, the state of the equipment 2 includes, for example, has operating state such as the ON/OFF state of the equipment 2, error state and the like.

A Web server 32 is provided in each equipment management device 3. The Web server 32 is a server that is able to provide Web contents 80 that will be described later. As will be described later, a monitoring program 82 for monitoring the states of each piece of the equipment 2 managed by plural equipment management devices 3 is included in the Web contents 80.

More specifically, the Web server 32 transmits Web contents 80 that are managed by the data manager 40 to the monitoring terminal 4 according to a request from the monitoring terminal 4. The Web server 32 comprises an equipment-data communicator 33, and a system-configuration-data communicator 34.

The equipment-data communicator 33 sets and monitors equipment data. The equipment-data communicator 33 transmits information related to changes in the state of equipment 2 to the monitoring terminal 4 when the state of equipment 2 that is managed by the equipment management device 3 has changed. More specifically, updated equipment data 70 is transmitted.

The system-configuration-data communicator 34 sets and monitors an equipment-management-device-address list 91 that stores address information for all of the equipment management devices 3 in the equipment management system 1. The equipment-management-device-address list 91 will be described later.

The data manager 40 is a computer and comprises a CPU (Central Processing Unit), memory and a storage device (none of which is illustrated in the drawings). Each of the components of the data manager 40 described below and the functions thereof are achieved by the CPU executing a program that is stored in the memory.

The data manager 40 manages various kinds of data required for monitoring an equipment group 7, and various kinds of data for displaying the monitoring screen of the equipment 2 on the monitoring terminal 4. The data that is managed by the data manager 40 is mainly divided into equipment data 70, Web contents 80 and system-configuration data 90.

The equipment data 70 includes connection information 71 for each piece of the equipment 2, operating-state data 72 and display-position data 73 for displaying equipment icons on a floor plan.

The connection information 71 is data that is necessary for connecting to an equipment group 7, and includes address number, operation group numbers, model ID information and the like for each piece of the equipment 2 that is managed by the equipment management device 3.

The operating-state data 72 is data that corresponds to information related to the current operating state of each piece of the equipment 2 (for example, in the case of an air-conditioner; the ON/OFF state, operating mode such as cooling or heating, set temperature, room temperature, error state, and the like). The operating-state data 72 is constantly updated to the most recent state by transmitting data to and receiving data from each piece of the equipment 2. In this embodiment, the data manager 40 that monitors the operating-state data 72 corresponds to an operating-state-data holder.

The display-position data 73 is data that indicates the floor number where each piece of equipment 2 is installed, and the X-coordinate and Y-coordinate of each piece of equipment 2 on a floor plan. The display-position data 73 is used when arranging icons of the equipment 2 on a floor plan that is displayed on an equipment-monitoring screen of the monitoring terminal 4 that will be described later. In other words, the display-position data 73 is data that indicates the display positions for plural pieces of equipment 2 on a floor plan. In this embodiment, the data manager 40 corresponds to a display-position-data holder.

Taking into consideration the case of managing plural buildings, it is also possible to add information to the display-position data 73 in addition to the floor number such as the building number. Moreover, in the display-position data 73, it is possible to indicate the X-coordinate and Y-coordinate as a percentage (0 to 100%) of the vertical and horizontal size. Furthermore, in the display-position data 73, when the floor plan is enlarged or reduced, it is possible to accordingly change the position information for the position where the equipment icons are displayed.

The Web contents 80 include a screen-configuration file 81, a monitoring program 82, and a floor-plan file 83.

The layout configuration of the screen (Web browser screen) that is displayed on the monitoring terminal 4 is stored in the screen-configuration file 81. The monitoring program 82 is a program that is executed by the Web browser, and performs various communication processing and screen-display processing. This monitoring program 82 is a program for monitoring the equipment 2 that is managed by plural equipment management devices 3. The floor-plan file 83 is floor-plan data for the floors of a building, and will be the background of the monitoring screen.

The screen-configuration file 81 will be explained in more detail. Files defining the layout configuration of the screens that are displayed on the monitoring terminal 4, and files of various images that are arranged on the screen according to the layout configuration are included in the screen-configuration file 81. The screen-configuration file 81 includes an HTML (Hyper Text Markup Language) file that describes the frame configuration, and various kinds of image files that are entered in GIF (Graphics Interchange Format) format, JPEG (Joint Photographic Experts Group) format, BMP (Bitmap) format and the like.

Continuing, the monitoring program 82 will be explained in detail. The monitoring program 82 is a program that can be executed by the Web browser. The monitoring program 82 is written in a language such as JAVA (registered trademark) script or the like. The monitoring program 82 is a program for collecting data necessary for performing communication with each of the equipment management devices 3, and displaying a monitoring screen. The monitoring program 82 is embedded in the screen-configuration file 81, and is executed when the Web browser executes the screen-configuration file 81.

Furthermore, the floor-plan file 83 will be explained in detail. In the floor-plan file 83 are images for displaying floor layouts as backgrounds for the monitoring screens so that it is possible to know the installation positions of equipment 2 in a building. Images of floor plans for each floor are stored in the floor-plan file 83.

In other words, the floor-plan file 83 is floor plan data that indicates an image of a floor plan of an area where plural pieces of equipment 2 is installed. In this embodiment, the data manager 40 corresponds to a floor plan-data holder.

The system-configuration data 90 is data related to the system configuration of the equipment management system 1. An equipment-management-device-address list 91 is included in the system-configuration data 90. The equipment-management-device-address list 91 holds address information for the each of the connection destinations for plural equipment management devices 3. In this embodiment, the data manager 40 that manages the equipment-management-device-address list 91 corresponds to an address holder.

The equipment-communication manager 50 is an interface for a dedicated communication line 5. Transmitting data to and receiving data from the equipment 2 is performed by way of this equipment-communication manager 50. The dedicated communication line 5 does not necessarily have to be a dedicated communication line, and configuration is also possible in which a general-purpose communication line such as LAN (Local Area Network) line, RS-485 interface and the like is used.

The monitoring-terminal-communication manager 60 is an interface for the communication line 6. Transmitting data to and receiving data from the monitoring terminal 4 is performed by way of this monitoring-terminal-communication manager 60. The communication line 6 is a communication line such as a LAN line, wireless LAN and the like that is capable of connecting to a PC.

Figure 3:
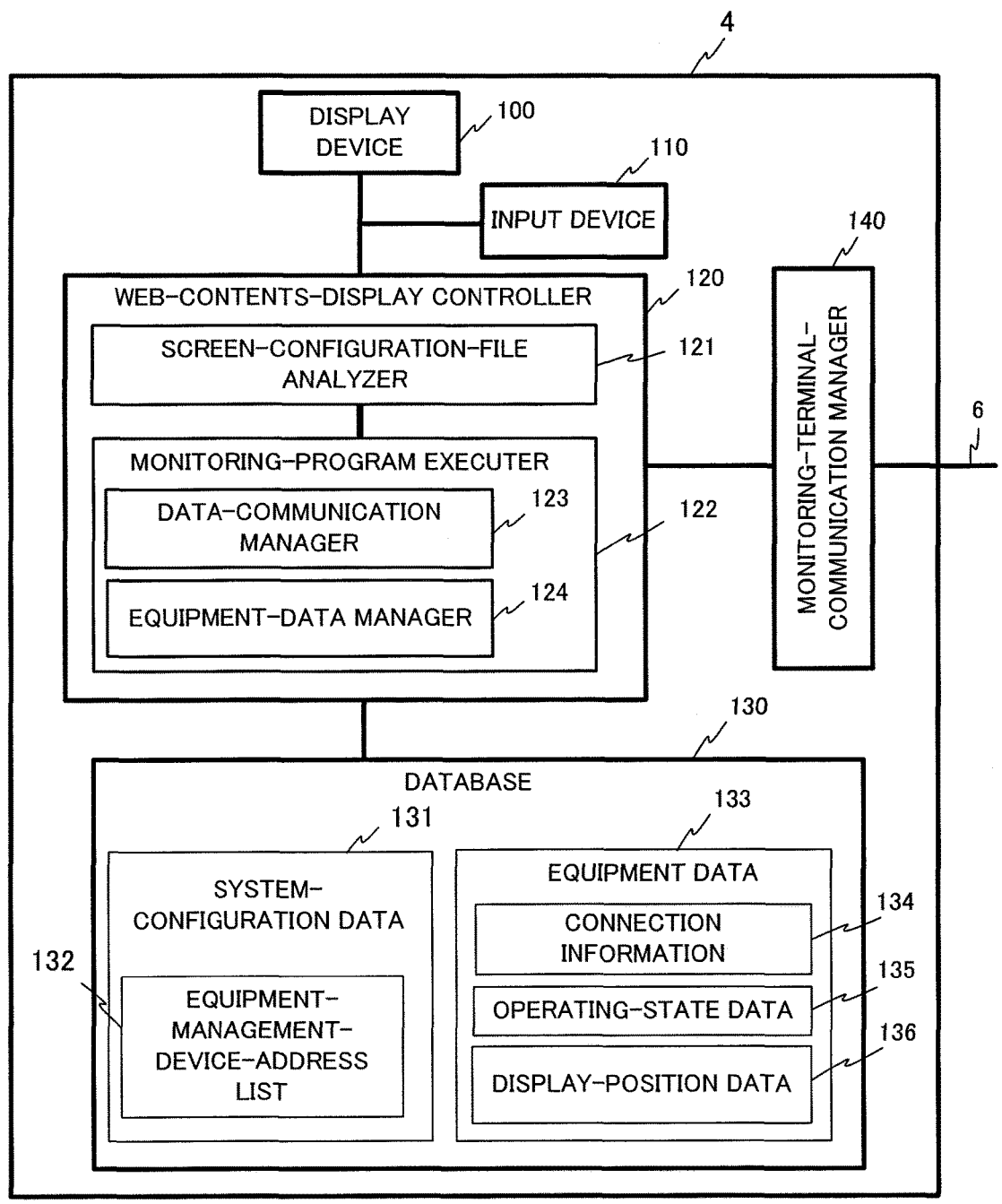
FIG. 3 is a block diagram illustrating the construction of a monitoring terminal of a first embodiment of the present disclosure.

Next, the construction of a monitoring terminal 4 will be explained. FIG. 3 illustrates the construction of a monitoring terminal 4.

The monitoring terminal 4 is a terminal that is capable of executing a Web browser that operates on a general-purpose PC. The Web browser of the monitoring terminal 4 receives Web contents 80 from the controllers 30 (Web servers 32) of the equipment management devices 3, and displays a monitoring screen according to the Web contents 80. As illustrated in FIG. 3, the monitoring terminal 4 comprises a display device 100, an input device 110, a Web-contents-display controller 120, a database 130 and a monitoring-terminal-communication manager 140.

The display device 100 displays screens of the Web browser that is executed by the Web-contents-display controller 120. More specifically, under the control of the Web-contents-display controller 120, the display device 100 displays a monitoring screen for the equipment 2 on the Web browser screen according to Web contents 80 acquired from the equipment management devices 3.

The input device 110 is an input device such as a mouse, keyboard, touch panel and the like. When the input device 110 is a touch panel, the input device 110 is located on the display device 100. When the manager operates an input device 110 such as a mouse, it is possible to switch the screen, operate the equipment 2 and the like according to inputted contents.

The Web-contents-display controller 120 is a computer that is capable of executing the Web browser. The Web-contents-display controller 120 comprises a CPU (Central Processing Unit), a memory and a storage device (none of which is illustrated in the drawings). By the CPU executing a program that is stored in the memory, all of the components of the Web-contents-display controller 120 described below and the functions thereof can be achieved.

The Web-contents-display controller 120 acquires Web contents 80 by performing communication with the equipment management device 3 of a connection destination that was inputted from the input device 110, and displays a monitoring screen for the equipment group 7 on the display device 100. More specifically, the Web-contents-display controller 120 executes the monitoring program 82, acquires information related to the states of the equipment 2 that are managed by each of plural equipment management devices 3, and displays on a monitoring screen (Web browser screen).

The Web-contents-display controller 120 comprises a screen-configuration-file analyzer 121 and a monitoring-program executer 122.

The screen-configuration-file analyzer 121 analyzes the acquired screen-configuration file 81. The monitoring-program executer 122 acquires Web contents 80 that are downloaded from equipment management devices 3, executes the monitoring program 82, then acquires and displays information related to the states of the equipment 2 managed by plural equipment management devices 3.

More specifically, the monitoring-program executer 122 executes the monitoring program 82, then acquires equipment-management-device-address list 91 that is held by each of the equipment management devices 3, connects to plural equipment management devices 3 using the acquired equipment-management-device-address list 91, and acquires equipment data 70 that is information related to the states of plural pieces of equipment 2 managed by the plural equipment management devices 3.

The monitoring-program executer 122 comprises a data-communication manager 123 and an equipment-data manager 124.

The data-communication manager 123 connects to the equipment management devices 3, acquires various data from each of the equipment management devices 3, and together with registering the acquired data in the database 130, displays the data on the screen. The data-communication manager 123, for example, acquires operating-state data 72 from plural equipment management devices 3, and displays the data on the Web browser screen. Moreover, together with acquiring the floor-plan file 83, the data-communication manager 123 acquires the display-position data 73 as display-position data 136, overlays the icons of plural pieces of equipment 2 over the floor plan image at positions indicated by the display-position data 136, and displays the result on the Web browser screen.

Moreover, after new equipment data 70 is received from an equipment management device 3, the equipment-data manager 124 updates the equipment data 133 in the database 130 based on that data.

The database 130 is a database that manages various data that is used by the monitoring-program executer 122. The database 130 is a computer that comprises a CPU (Central Processing Unit), a memory and a storage device (none of which is illustrated in the drawings). By the CPU executing a program that is stored in the memory, all of the components of the database 130 and the functions thereof that are described below are achieved. System-configuration data 131 and equipment data 133 are included in the database 130.

The system-configuration data 131 is data related to the system configuration of the equipment management system 1. An equipment-management-device-address list 132 is included in the system-configuration data 131. The equipment-management-device-address list 132 is a list of addresses of equipment management devices such as IP addresses and a host name or the like that are identifying information for plural equipment management devices 3 at the connection destinations.

Equipment-connection information 134, operating-state-data 135, and display-position data 136 are included in the equipment data 133. The equipment data 133 is constantly kept updated by the equipment-data manager 124.

The system-configuration data 131 and equipment data 133 of the database 130 correspond to the system-configuration data 90 and equipment data 70 of the data manager 40 of the equipment management device 3 illustrated in FIG. 2.

The monitoring-terminal-communication manager 140 is an interface for the communication line 6. Data is transmitted to or received from an equipment management device 3 by way of this monitoring-terminal-communication manager 140.

Next, the operation of an equipment management device 3 and monitoring terminal 4 will be explained with reference to FIG. 4, FIG. 5, FIG. 6 and FIG. 7.

Figure 4:
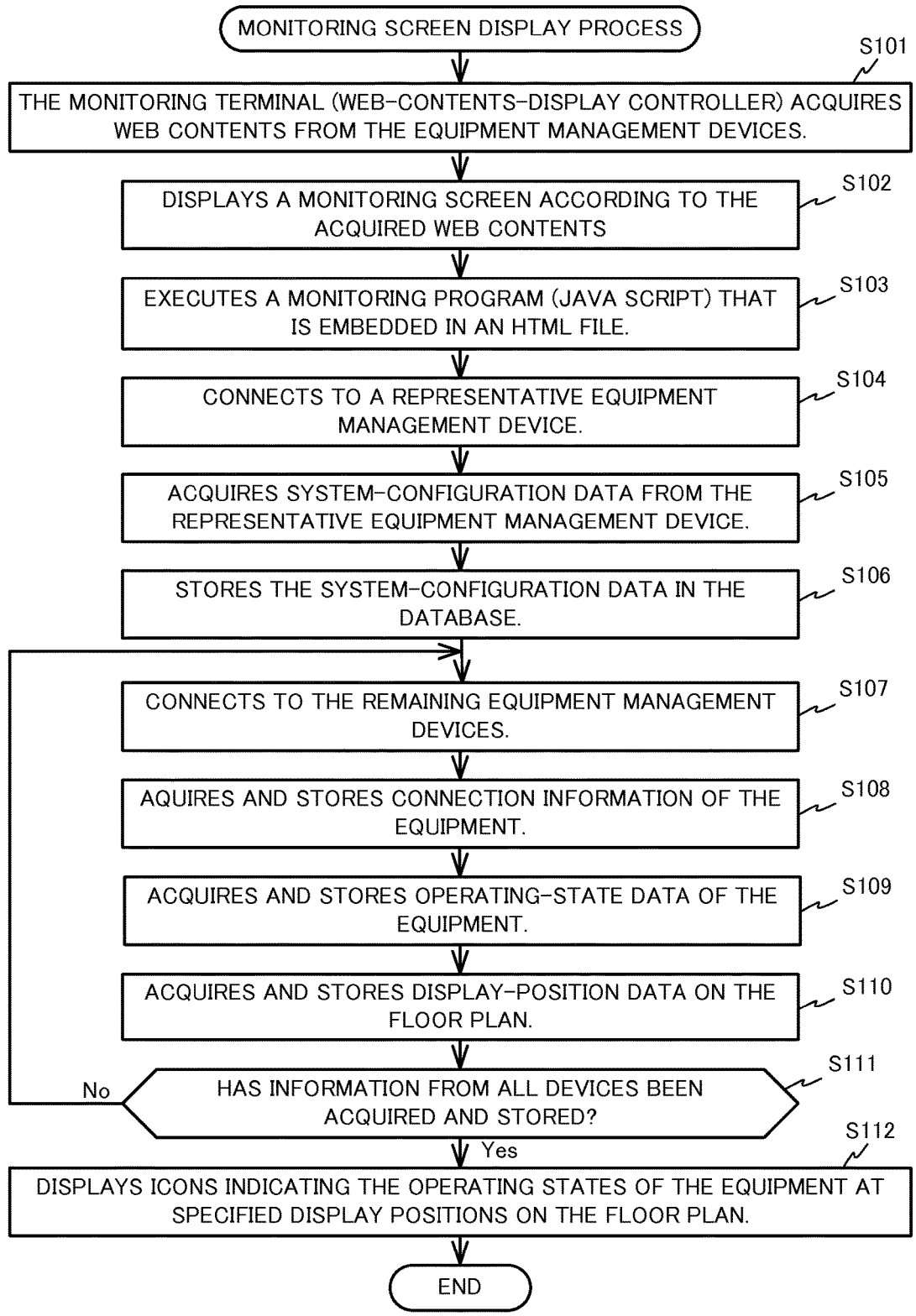
FIG. 4 is a flowchart of the monitoring screen display process.

FIG. 4 illustrates the flow of processing (monitoring-screen-display process) when the URL of an equipment management device 3 is inputted on the Web browser that is displayed on the display device 10 of the monitoring terminal 4, and a page for monitoring equipment 2 is opened.

After the URL has been inputted on the Web browser of the monitoring terminal 4, the Web-contents-display controller 120 of the monitoring terminal 4 acquires Web contents 80 from the equipment management device 3 (step S101). More specifically, the Web-contents-display controller 120, by way of the monitoring-terminal-communication manager 140, uses HTTP protocol (Hypertext Transfer Protocol) to start the connection with the equipment management device 3. The Web server 32 of the equipment management device 3, by way of the monitoring-terminal-communication manager 60, allows the connection, and transmits the requested Web contents 80 to the monitoring terminal 4.

Next, the monitoring terminal 4 (Web-contents-display controller 120) displays a monitoring screen according to the acquired Web contents 80 (step S102). More specifically, the Web-contents-display controller 120 analyzes the acquired Web contents 80 by way of the screen-configuration-file analyzer 121, and acquires an HTML file (screen-configuration file 81) that is included in the Web contents. The Web-contents-display controller 120 then displays a monitoring screen according to the acquired HTML file.

Continuing, the monitoring terminal 4 (Web-contents-display controller 120) executes the monitoring program 82 that is embedded in the HTML file (step S103). Here, the monitoring program is written in JAVA (registered trademark) script.

Next, the data-communication manager 123 in the monitoring-program executer 122 of the monitoring terminal 4 connects to the equipment management device (representative equipment management device) 3 from which the Web contents 80 were acquired by the WebSocket method (step S104).

Here, the WebSocket method is a technical standard for bi-directional communication between a Web server and Web client. The WebSocket method differs from the HTTP protocol in that the connection can always remain connected. Therefore, when communication is necessary, it is possible to start transmission from either the Web server or Web client. As a result, the other end can be notified in real-time of changes in the equipment 2 due to an operation or state change.

After the connection is complete, the monitoring terminal 4 (data-communication manager 123) acquires system-configuration data 90 from the equipment manager device 3 (step S105). The system-configuration data 90 includes an equipment-management-device-address list 91, which is a list of address information such as IP addresses of the connected equipment management devices 3, host name and the like.

The monitoring terminal 4 (data-communication manager 123) stores the acquired system-configuration data 90 as the system-configuration data 131 in the database 130 (step S106).

Continuing, the monitoring terminal 4 (data-communication manager 123) connects to any of the equipment management devices 3 by the WebSocket method (step S107). For this connection, the IP address or host name that is included in the system-configuration data 131 of the database 130 is used.

While connected by the WebSocket method, the monitoring terminal 4 (data-communication manager 123) acquires connection information 71 for the equipment 2, and stores that information as connection information 134 (step S108).

Next, the monitoring terminal 4 (data-communication manager 123) acquires operating-state data 72 for the equipment 2, and stores that data as operating-state data 135 (step S109).

Continuing, the monitoring terminal 4 (data-communication manager 123) acquires display-position data 73 on a floor plan, and stores that data as display-position data 136 (step S110).

The equipment connection information 134, the equipment operating-state data 135 and the display-position data 136 on a floor plan are stored as equipment data 133 in the database 130.

Next, the monitoring terminal 4 (data-communication manager 123) determines whether or not acquiring and storing information for all devices is complete (step S111). When not complete (step S111; No), the monitoring terminal 4 (data-communication manager 123) returns to step S107.

After this, the monitoring terminal 4 (data-communication manager 123) repeats steps S107→S108'S109→S110→S111 until acquiring and storing information for all of the devices has been completed. When acquiring and storing information for all of the devices is complete (step S111: Yes), the monitoring terminal 4 (data-communication manager 123) displays equipment icons that indicate the operating states on the floor plan that is displayed on the Web browser screen according to the display-position data 136 for all of the equipment 2 (step S112).

At this point, the monitoring-screen-display process by the monitoring terminal 4 ends, and it becomes possible to monitor the equipment groups 7 that are managed by plural equipment management devices 3 on the same Web page of the same Web browser.

From this point on, when the state of the equipment 2 changes, the equipment management device 3 (equipment-data communicator 33) sends a notification to the monitoring terminal 4 of the contents of that change in the state. After receiving the notification, the monitoring terminal 4 stores the contents as operating-state data 135 or display-position data 136 of the equipment data 133. After the equipment data 133, such as the operating-state data 135 or display-position data 136 has been updated, the equipment-data manager 124 that is achieved by the monitoring-program executer 122 updates the equipment icon display state that indicates the operating state according to the display-position data for each piece of equipment 2.

Figure 5:
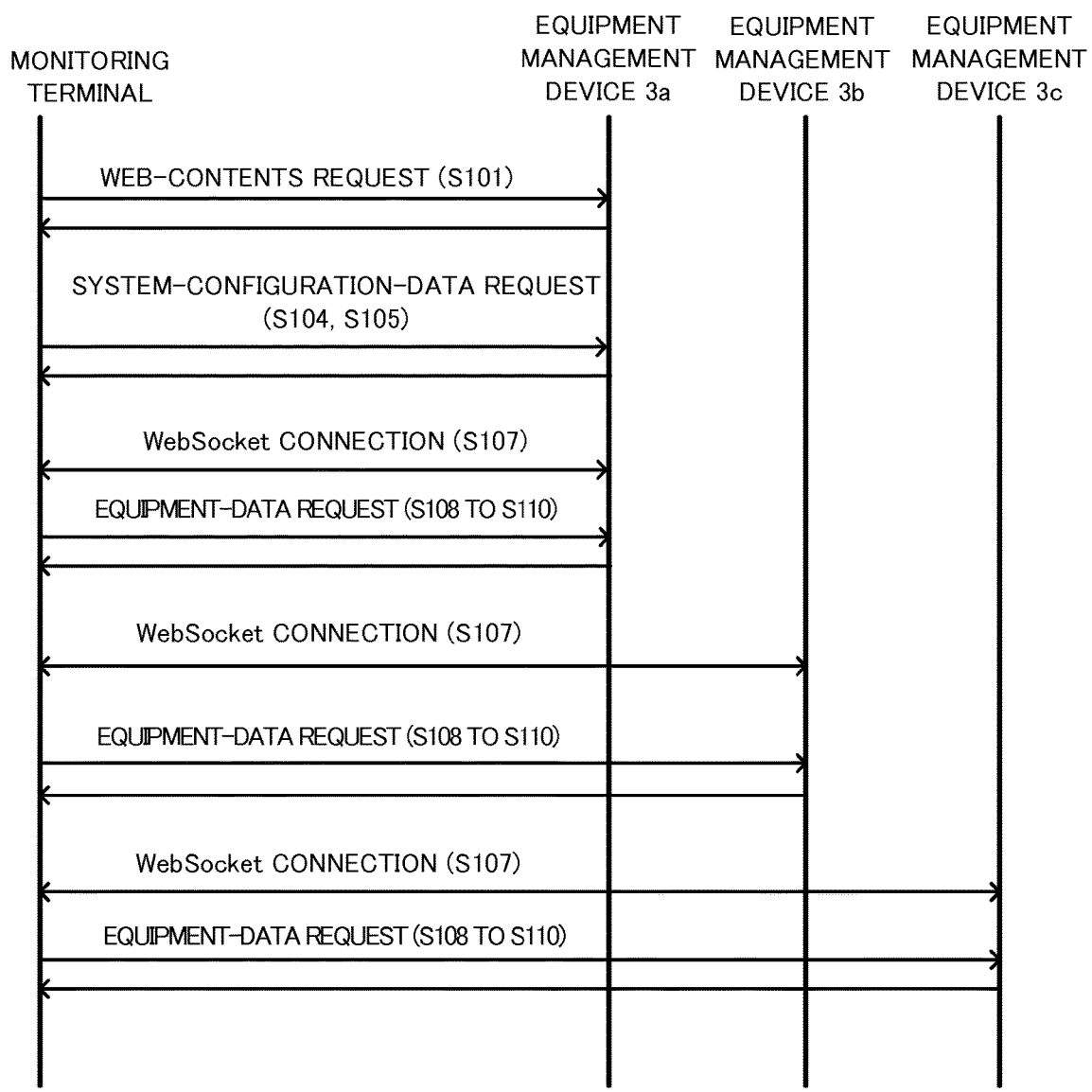
FIG. 5 is a sequence drawing illustrating the communication procedure between the monitoring terminal and an equipment management device.

FIG. 5 illustrated the communication procedure between the equipment management devices 3 and the monitoring terminal 4 in the monitoring-screen-display process as illustrated in FIG. 4. As illustrated in FIG. 5, the monitoring terminal 4 acquires Web contents 80 from a representative equipment management device 3 (step S101), and acquires system-configuration data 90 from the representative equipment management device 3 (steps S104, S105).

Moreover, the monitoring terminal 4 connects to each equipment management device 3 by the WebSocket method (step S107), and directly acquires equipment data 70 from each equipment management device 3 (steps S108 to S110). As a result, decentralization of the processing of the entire system is achieved.

Figure 6:
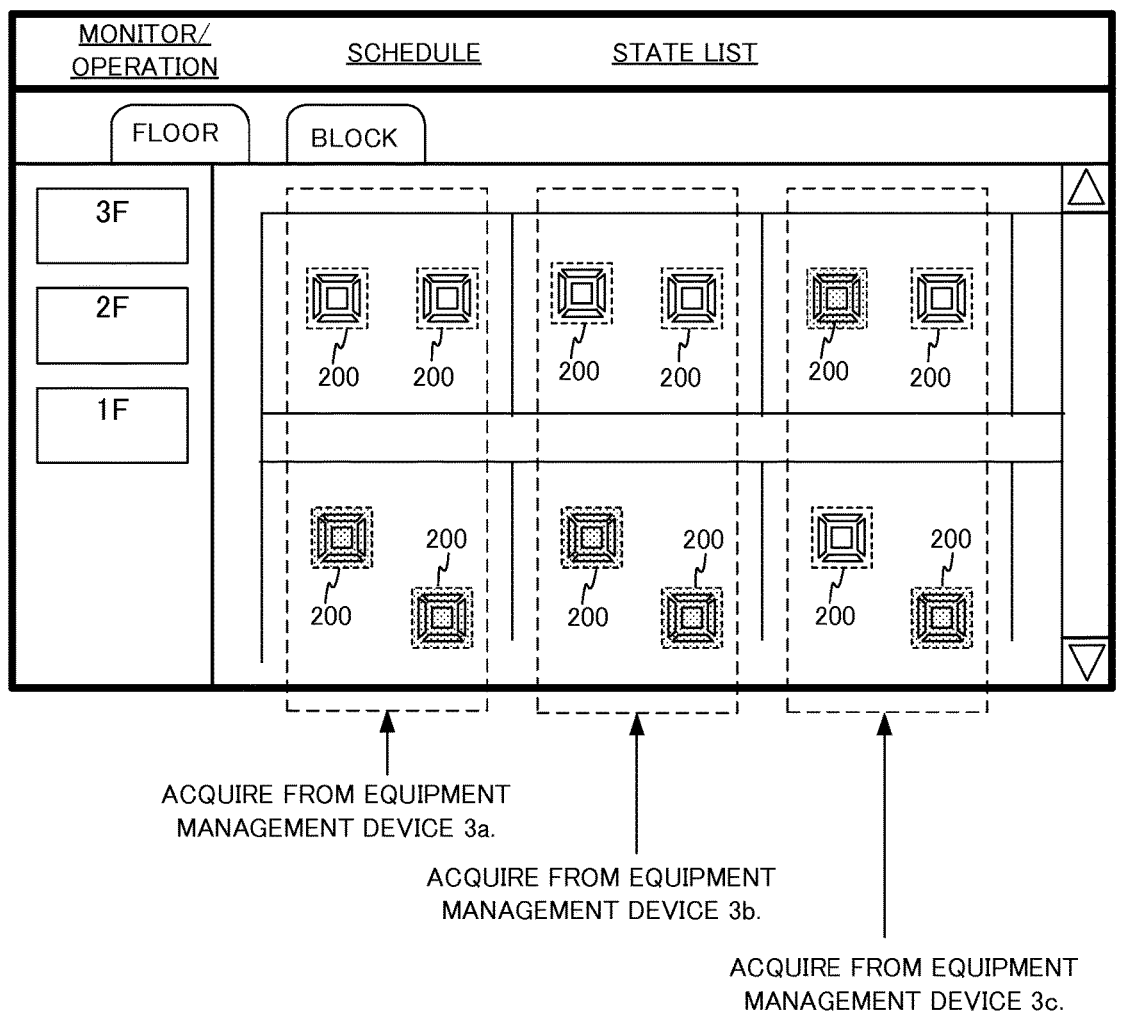
FIG. 6 is a drawing illustrating an example of a floor-monitoring screen that is displayed by monitoring terminal.

FIG. 6 illustrates an example of a floor-monitoring screen that is displayed on the monitoring terminal 4 by the monitoring-screen-display process. As illustrated in FIG. 6, in this example, equipment management devices 3a, 3b, 3c are arranged on the same floor, and the equipment groups 7 that are connected to each are the targets of monitoring.

On the monitoring screen of the monitoring terminal 4, a floor plan is displayed on one screen of the Web browser according to display-position data 136 that was acquired from each equipment management device 3. Icons 200 are arranged on that floor plan according to operating-state data 135 of each piece of the equipment 2 that was acquired from plural equipment management devices 3a, 3b, 3c. The display state of each icon 200 indicates the operating state of the corresponding equipment 2.

Here, an example in which plural equipment management devices 3a, 3b, 3c were installed on the same floor was explained; however, in the case where equipment management devices 3 are installed in units of each floor, it is possible to similarly display the operating states of the equipment 2 on plural floors on one screen of the Web browser.

FIG. 7 illustrates an example of a screen that is displayed on the monitoring terminal 4 and that displays a unit where an error occurred. As illustrated in FIG. 7, in this example, information for equipment 2 in which an errors occurred is collectively displayed on one screen of the Web browser in order of the date and time of occurrence according to operating-state data 135 for each piece of the equipment 2 that was acquired from the equipment management devices 3a, 3b, 3c.

Next, processing that is performed when the operating state of the equipment 2 is changed will be explained with reference to FIG. 8 and FIG. 9.

Figure 8:
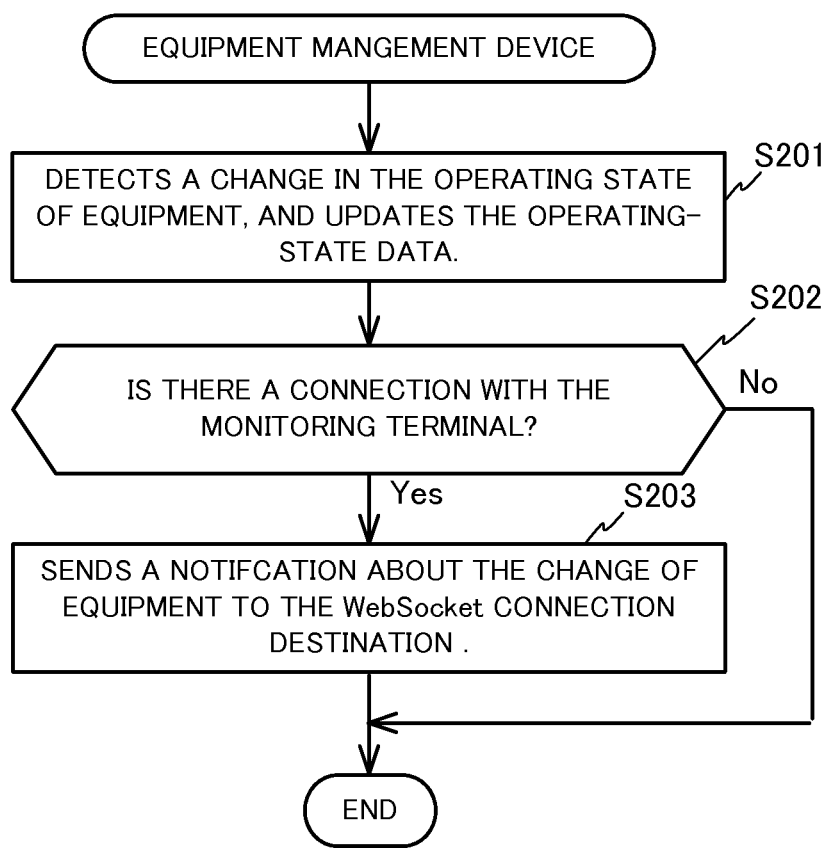
FIG. 8 is a flowchart of processing by an equipment management device when there was a change in the state of equipment.

FIG. 8 illustrates the flow of processing by an equipment management device 3 when the operating state of equipment 2 has changed.

As illustrated in FIG. 8, when equipment 2 is operated by a connected remote control (not illustrated in the figure) or an equipment management device 3, the equipment manager 31 of the equipment management device 3 detects a change in the state of the equipment 2 from a notification from the equipment 2, and updates the operating-state data 72 (step S201).

Continuing, the controller 30 of the equipment management device 3 determines whether or not there is a connection with the monitoring terminal 4 (whether or not there is a WebSocket connection) (step S202). When there is a connection (step S202: Yes), the equipment management device 3 (equipment-data communicator 33) sends a notification to the monitoring terminal 4 at the WebSocket connection destination about the change in operating state of the equipment 2 (step S203). More specifically, the equipment management device 3 (equipment-data communicator 33) transmits operating-state data 72 to the monitoring terminal 4. After that, the equipment management device 3 ends the processing.

Figure 9:
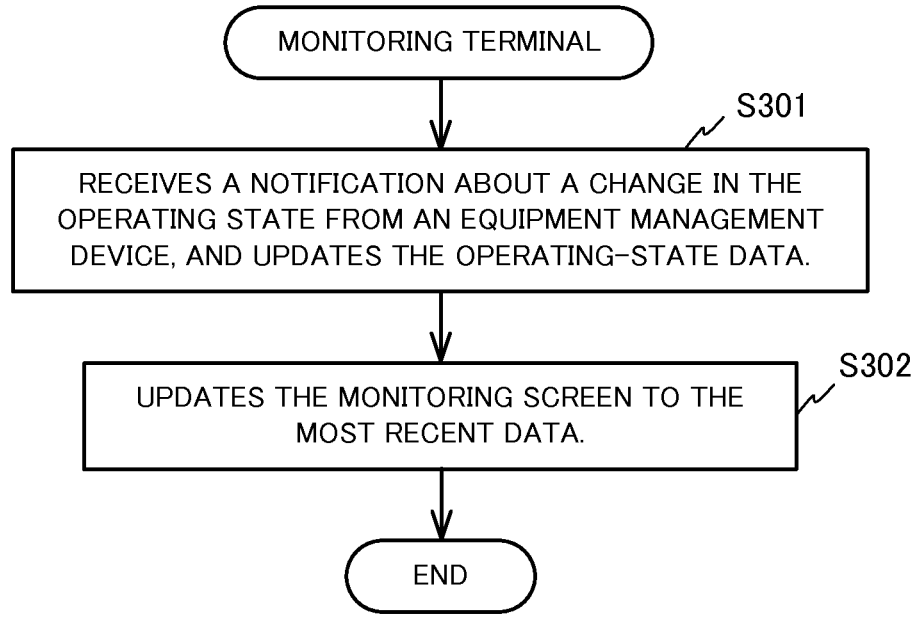
FIG. 9 is a flowchart of processing by the monitoring terminal when a report of a change in state has been received from an equipment management device.

FIG. 9 illustrates the flow of processing by the monitoring terminal 4 when a notification is received from an equipment management device 3 about a change in the operating-state data 72 of equipment 2.

As illustrated in FIG. 9, when a notification about a change in the operating state of equipment 2 is received from an equipment management device 3, or in other words, when operating-state data 72 is received, the equipment-data manager 124 of the monitoring terminal 4 uses the received operating-state data 72 and updates the operating-state data 135 in the equipment data 133 (step S301).

Next, the equipment-data manager 124 of the monitoring terminal 4 updates the monitoring screen that is currently displayed with the latest data (in other words, the updated operating-state data 135 is reflected) (step S302).

After that, the monitoring terminal 4 ends the process for the case when the operating state of equipment 2 is changed. From the operation described above, it is possible to constantly monitor the equipment groups 7 that are managed by plural equipment management devices 3, and always keep the operating-state data 135 updated with the most recent data.

It is possible to set Web contents 80 and system-configuration data 90 that are to be stored by an equipment management device 3, in the equipment management device 3 beforehand. In that case, setting the Web contents 80 and system-configuration data 90 can be performed from an input device 20 of the equipment management device 3, or can be performed from the Web browser of the monitoring terminal 4.

Moreover, display-position data 73 of each piece of equipment 2 can also be similarly set from the input device 20 of an equipment management device 3. In that case, it is also possible to perform the setting while checking the display position using the Web browser of the monitoring terminal 4.

Furthermore, in this embodiment, an equipment management device 3 comprises a display device 10 and input device 20; however, that does not necessarily mean that a display device 10 or input device is necessary. Settings, operation and the like can also be performed from the monitoring terminal 4 by communication over a communication line 7 without there being a display device 10 or input device 20.

In this embodiment, a Web browser of a monitoring terminal 4 was used. However, the Web browser may also be on an equipment management device 3. It is possible to activate a Web browser on the equipment management device 3 that will become the representative, read the Web contents 80 and execute the same processing as in FIG. 4, and monitor an equipment group 7 that is connected to another equipment management device 3 on the display device 10 of the representative equipment management device 3.

Moreover, in this embodiment, a PC was used as the monitoring terminal 4; however, it is not absolutely necessary to use a PC. For example, it is also possible to use a dedicated terminal or a tablet terminal that is capable of operating the monitoring program 82.

It is also possible to use a text format that uses XML (eXtensible Markup Language) or the like as the format for data that is communicated between the monitoring terminal 4 and the equipment management devices 3. It is also possible to use other formats such as binary format in order to reduce the communication size. Communication can also be encoded so that the communication information can be kept confidential.

Furthermore, in this embodiment, WebSocket that is capable of constant connection was used as the communication method; however, it is not absolutely necessary to use WebSocket. For example, communication can also be performed using HTTP protocol or an original protocol.

As was explained above, with this first embodiment, by executing a monitoring program 82 that is included in Web contents 80 that are read by the Web browser (Web-contents-display controller 120), the states of the equipment 2 managed by each of plural equipment management devices 3 are acquired. The monitoring program 82 is executed by the Web browser, so that the acquired equipment data can be displayed on the same screen as the Web browser as part of the same Web page.

In doing so, it is possible to simultaneously display together on the same Web page the states of equipment 2 managed by plural equipment management devices 3. As a result, it is possible to avoid oversight of devices in which errors are occurring and forgetting to turn OFF lights, which occurred in the past because it was only possible to check the operating state or error state for one equipment management device 3 at a time. And it is possible to avoid the complexity of management in the case of not being able to manage all equipment without having to switch the connection destination (URL) for each individual of the equipment management devices.

Moreover, with this first embodiment, by executing the monitoring program 82 that is included in the Web contents 80 and executed by the Web browser, connection is made with plural equipment management devices 3, and floor-plan files 83 and display-position data 73 are acquired by the monitoring terminal 4 By doing so, it becomes possible to simultaneously display the states of equipment 2 managed by plural equipment management devices 3 together using icons 200 or the like on a floor plan in the same Web page. As a result, it is possible to simultaneously display on the same floor plan the states of plural pieces of equipment 2 located on the same floor that conventionally were managed by different equipment management devices 3.

Furthermore, in this embodiment, it is also possible to monitor equipment groups 7 that are connected to other equipment management devices by using one URL and simply opening the Web contents 80 of one equipment management device. Therefore, it is no longer necessary for the monitoring terminal 4 to store a URL for all of the equipment management devices 3.

In this first embodiment, an equipment group 7 is dispersed among and managed by each equipment management device 3. Moreover, by executing the monitoring program 82 by the Web browser, the monitoring terminal 4 also acquires the states of the managed equipment group 7 from equipment management devices 3 other than the equipment management device 3 that read the Web contents. As a result, it is possible to reduce the load on one equipment management device 3, so that it is possible to manufacture equipment management devices 3 using a low-performance and low-cost CPU.

Conventionally, a high-performance and high-cost centralized management device was used in order to display the states of the equipment 2 in an entire building using one Web page or application. However, by using the system of this embodiment, there is no need for such a centralized management device.

Moreover, in communication that uses the typically used HTTP protocol, a TCP connection is made from the client side (monitoring terminal 4 side) to the server side (equipment management device 3), and then after the states of the equipment 2 are monitored, the connection is disconnected. With this kind of construction, the server does not know the address of the server except when connected, so that it was not possible to send a notification immediately even when there was a change in the state of the equipment.

Therefore, in this embodiment, WebSocket that can be used from the Web browser is used, and there is always a connection with the equipment management devices 3. By doing so, it is possible to send a notification from an equipment management device 3 to the connected monitoring terminal 4 in the case of a change in the state of the equipment 2. As a result, it is possible to constantly monitor the most recent state of the equipment 2 using the Web browser.

Typically, when sending a notification of a change in the state of the equipment 2 it is necessary to set the address of the monitoring terminal 4 in the equipment management devices 3; however, by using a WebSocket connection that is always-connected, it is not necessary to set the address of the monitoring terminal 4 in the equipment management devices 3. Therefore, it is possible to monitor the operating state of an equipment group 7 from an unspecified large number of monitoring terminals 4.

Moreover, a built-in type of low-cost CPU is often used in equipment management devices 3. Therefore, the number of equipment in an equipment group 7 that can be managed by an equipment management device 3 is limited depending on the CPU performance and performance of memory such as ROM and RAM. It was only possible to simultaneously monitor the number of equipment managed by the equipment management device 3 on the same screen of the Web browser. However, by using the equipment management system 1 of this embodiment, it is possible to use the ample CPU and memory of a PC, and collectively monitor on one screen of the Web browser the equipment groups 7 of an entire building that are managed by plural equipment management devices 3.

Second Embodiment

Next a second embodiment of the present disclosure will be explained.

The equipment management system 1 and equipment management devices 3 of this second embodiment of the present disclosure have the same construction as that used in the first embodiment illustrated in FIG. 1 and FIG. 2; however, the Web contents 80 and system-configuration data 90 that were only used by a representative equipment management device 3 in the first embodiment, are also used by other representative equipment management devices 3.

In this embodiment, when there is a change in the stored data, the controller 30 of each equipment management device 3 transmits the changed data to the other equipment management devices 3. In this embodiment, the controller 30 corresponds to a data updater.

Figure 10:
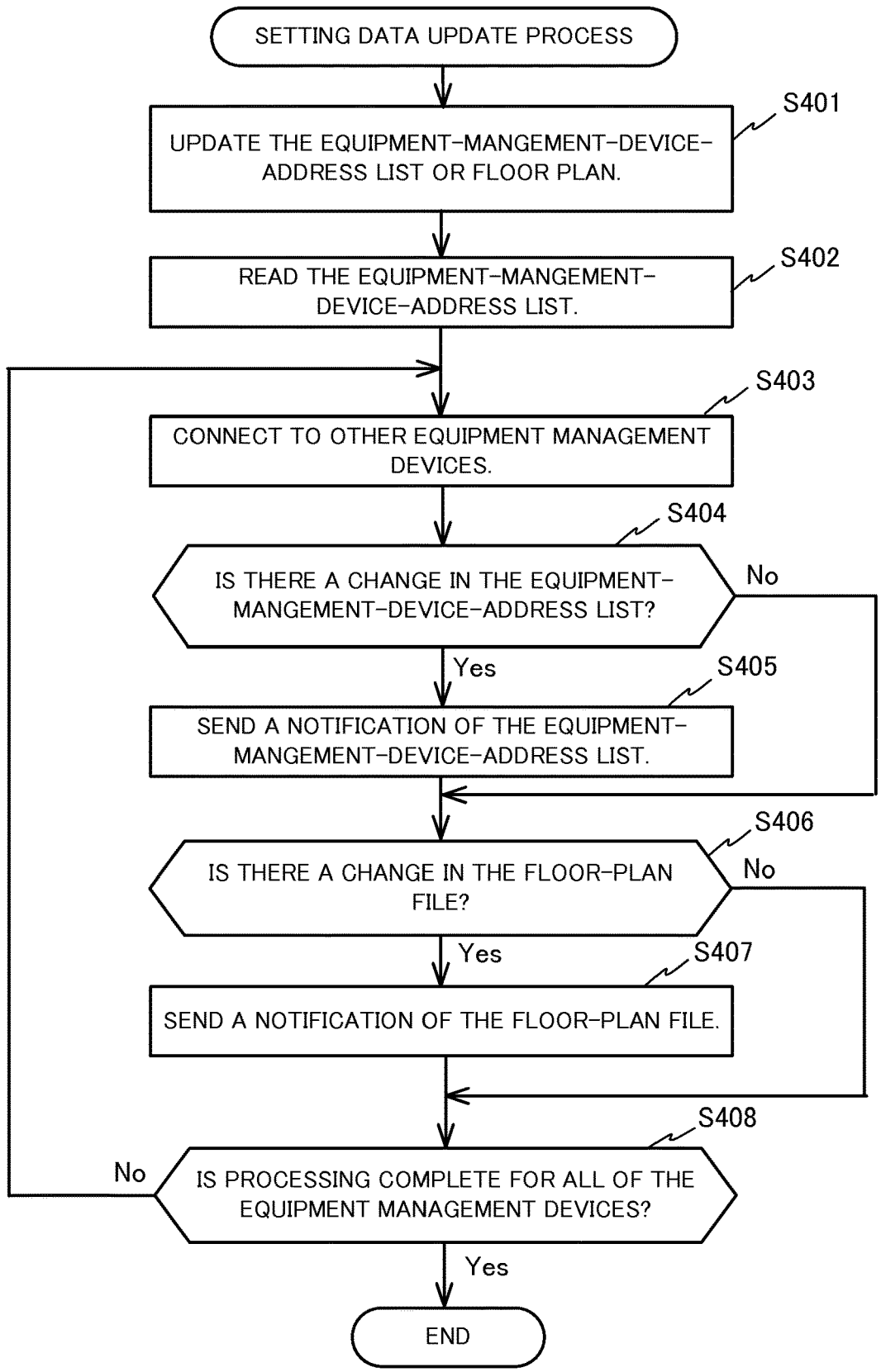
FIG. 10 is a flowchart of setting-data update processing in an equipment management system of a second embodiment of the present disclosure.

FIG. 10 illustrates the setting-data-update process when the equipment-management-device-address list 91 or floor-plan file 83 is updated for the representative equipment management device 3. The controller 30 executes the setting-data-update process.

As illustrated in FIG. 10, first, when a user updates the equipment-management-device address list 91 or floor-plan file 83 using an input device 20, the equipment management device 3 (controller 30) updates the equipment-management-device-address list 91 or floor-plan file 83 in the data manager 40 according to the changed contents (step S401).

Continuing, the equipment management device 3 (controller 30) reads the equipment-management-device-address list 91 (step S402), and executes the following process for all of the equipment management devices 3 in the list.

First, the equipment management device 3 (controller 30) connects to the other equipment management devices via the communication lines 6 (step S403). Next, the equipment management device 3 (controller 30) sends a notification of the equipment management-device-address list 91 only when the equipment management-device-address list 91 has been updated (step S404: Yes) (step S405). In that case, it is possible to transmit the equipment management-device-address list 91 itself, or transmit just the data that is different from the previous time.

The equipment management device 3 (controller 30) then sends a notification of the floor-plan file 83 (step S407) only when the floor-plan file 83 has been updated (step S406: Yes)

Next, the equipment management device 3 (controller 30) determines whether or not the notification has been performed for all equipment management devices 3 (step S408). Step S403 to step S408 are repeated until the notification is complete for all of the equipment management devices 3 (step S408: No). When the notification is complete (step S408: Yes), the equipment management device 3 (controller 30) ends processing.

From the processing above, when the equipment-management-device-address list 91 or floor-plan file 83 of an equipment management device 3 is changed, it is possible to share the changed equipment-management-device-address list 91 or floor-plan file 83 with all of the equipment management devices 3 in the equipment management system 1.

In order to distinguish whether the equipment-management-device-address list 91 or floor-plan file 83 was changed by the user using an input device 20, or changed by the setting-data-update process, it is possible to insert a flag into the data, or save the data in different communication formats.

Moreover, in this embodiment, the setting-data-update process for the case in which the equipment-management-device-address list 91 or floor-plan file 83 was changed is explained; however, it is also possible to perform a similar setting-data-update process for the case in which other data is changed.

As was explained in detail above, with the equipment management device 3 of this second embodiment, all of the equipment management devices 3 of the equipment management system 1 store the latest equipment-management-device-address list 91 and floor-plan file 83. Therefore, even when the representative equipment management device 3 is disabled, by connecting to another equipment management devices 3, it is possible to monitor the equipment groups 7 without the disabled equipment management device 3. As a result, it is possible to avoid the risk of not being able to monitor all of the equipment groups 7 due to one disabled equipment management device 3.

With the equipment management devices 3 and monitoring terminal 4 of this second embodiment, it is possible to manage the equipment groups 7 in the same way no matter which equipment management device 3 is connected. Therefore, by dividing up the equipment management devices 3 connected to each user, it is possible to disperse the processing load on the equipment management devices 3 for downloading the Web contents 80.

Figure 11:
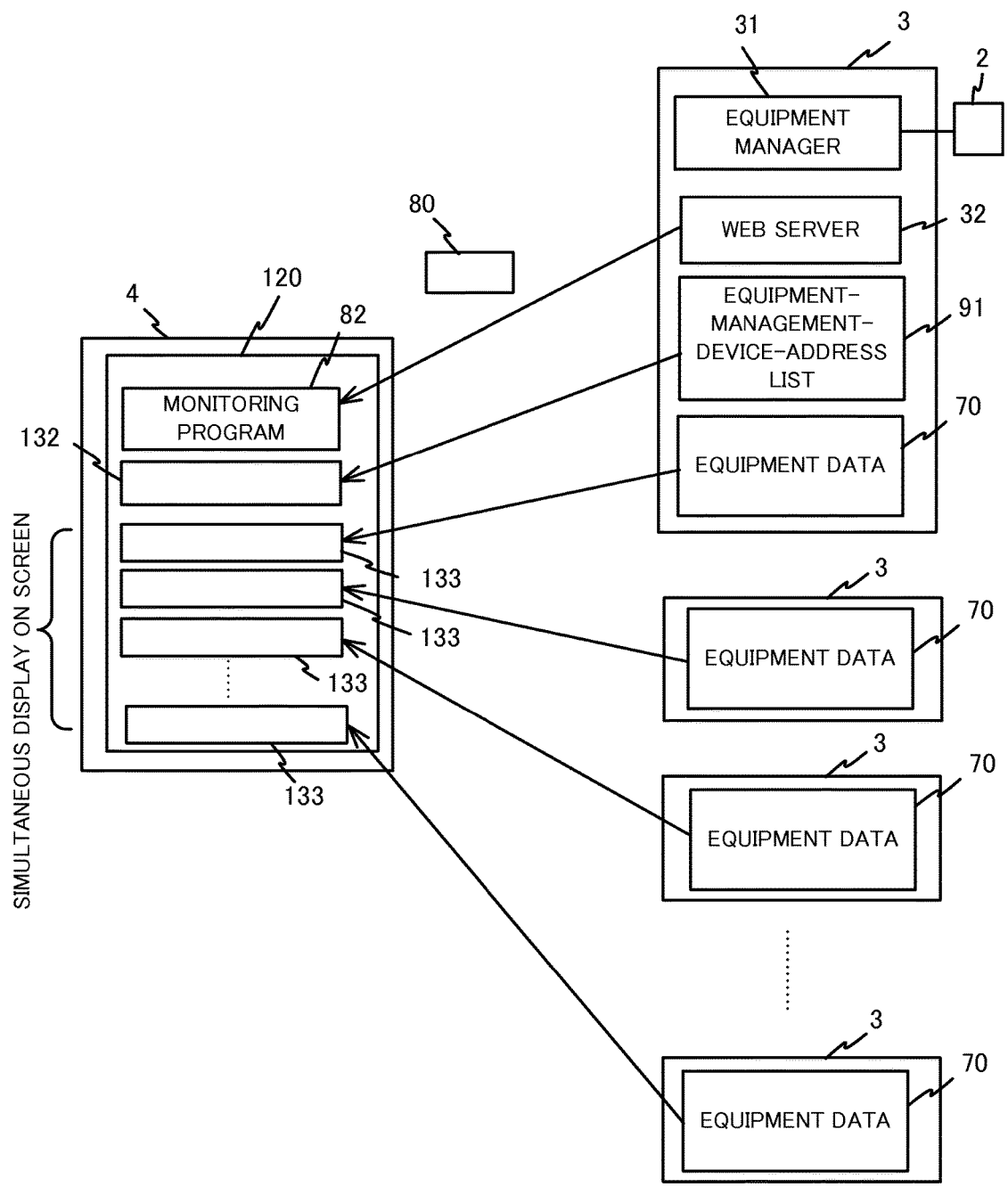
FIG. 11 is a block diagram illustrating the conceptual configuration of an equipment management system of the first and second embodiment of the present disclosure.

FIG. 11 illustrates the conceptual configuration of the equipment management system 1 of the embodiments described above. As illustrated in FIG. 11, the equipment management system 1 is an equipment management system that manages equipment using plural equipment management devices.

An equipment manager 31 is provided in each equipment management device 3. The equipment manager 31 manages the connected equipment 2.

Moreover, a Web server 32 is provided in each equipment management device 3. The Web server 32 acquires Web contents 80 that are transmitted from the Web server 32, executes the monitoring program 82, acquires the equipment-management-device-address list 91, uses the acquired equipment-management-device-address list 91 to connect to each of plural equipment management devices 3, acquires information about the states of the equipment 2 that are managed by each of the equipment management devices 3, and displays that information on a Web browser screen.

Moreover, an equipment-management-device-address list 91 is provided in each equipment management device 3. The equipment-management-device-address list 91 is a list of address information for plural equipment management devices 3.

On the other hand, a Web browser, or in other words, a Web-contents-display controller 120 is provided in the monitoring terminal 4 The Web-contents-display controller 120 acquires Web contents 80, executes the monitoring program 82, acquires information related to the states of the equipment 2 managed by plural equipment management devices 3, and collectively displays the information on one screen.

More specifically, the Web-contents-display controller 120 executes the monitoring program 82, acquires the equipment-management-device-address list 91, uses the acquired equipment-management-device-address list 91 to connect to each of plural equipment management devices 3, acquires information related to the states of plural pieces of equipment 2 that are managed by the plural equipment management devices 3, and collectively displays that information simultaneously on the display screen of the Web browser.

In other words, with the embodiments described above, by executing a monitoring program 82 that is included in Web contents 80 that are read by a Web-contents-display controller 120 (Web browser) on the Web browser, the states of equipment 2 managed by plural equipment management devices 3 are acquired.

The monitoring program 82 is executed by the Web browser, so that the acquired equipment data can be displayed on the same screen of the Web browser as part of the same Web page. As a result, even when an unspecified large number of equipment management device 3 are installed, it is possible to monitor the states of the equipment 2 managed by plural equipment management devices 3 on the same Web browser screen.

In the embodiments above, it is possible to configure a system that executes the program described above by storing and distributing the program to be executed on a computer-readable recording medium such as a flexible disc, CD-ROM (Compact Disc Read-Only Memory), DVD (Digital Versatile Disc), MO (Magneto-Optical Disc) and the like, and installing the program.

Moreover, it is also possible to store the program on a disc drive or the like of a specified server on a communication network such as the Internet, and then, for example, download the program by superimposing that program on a carrier wave or the like.

Furthermore, when the OS (Operating System) shares and executes the functions described above, or when the OS and applications work together to achieve the functions above, the portion other than that of the OS can be stored and distributed on a medium, or can be downloaded.

The present disclosure can be embodied in various ways and can undergo various modifications without departing from the broad spirit and range of the present disclosure. Moreover, the embodiments described above are for explaining the present disclosure, and do not limit the range of the present disclosure. In other words, the scope of the present disclosure is according to the claims and not the embodiments. Various modifications that are performed within the range of the claims or within the range of equivalent claims are also regarded as being within the range of the present disclosure.

INDUSTRIAL APPLICABILITY

The present disclosure is suitable for managing plural equipment installed in housing such as in a building or the like by plural equipment management devices.

The invention claimed is:
1. An equipment management system for managing equipment by each of plural equipment management devices, comprising:
   the plural equipment management devices; and
   a monitoring terminal that connects to each of the plural equipment management devices by a WebSocket method and communicates with each of the plural equipment management devices, wherein:
   at least one of the plural equipment management devices comprises:
      a Web server that provides Web contents that include a monitoring program for monitoring the state of the equipment managed by each of the plural equipment management devices and a screen-configuration file that indicates the configuration of one screen; and
      address holders that hold a list of addresses of the plural equipment management devices,
   the monitoring terminal comprises a Web browser that acquires the Web contents provided by the Web server; and executes the monitoring program included in the acquired Web contents to send a request to the at least one of the plural equipment management devices, to acquire the list that is held by the address holders from the at least one of the plural equipment management devices, to connect to each of the plural equipment management devices based on the acquired list, to acquire information about the states of the equipment from each of the plural equipment management devices based on the acquired list, and to display the acquired information about the states of the equipment on one screen disposed according to the configuration of the screen indicated by the screen-configuration file that is included in the acquired Web contents, and the at least one of the plural equipment management devices, upon receipt of the request from the monitoring terminal, sends the list to the monitoring terminal.

2. The equipment management system according to claim 1, wherein each of the plural equipment management devices and the monitoring terminal are always-connected; and each of the plural equipment management devices further comprises an equipment-data communicator that sends information about a change in the state of equipment to the monitoring terminal when a change in the state of the equipment managed by each of the equipment management devices occurred.

3. The equipment management system according to claim 1, wherein each of the plural equipment management devices comprises the Web server and the address holders; and the Web browser acquires Web contents provided by the Web server and the list held by the address holders from a representative equipment management device which is any one of the plural equipment management devices.

4. The equipment management system according to claim 1, wherein each of the plural equipment management devices comprises the Web server and the address holders; and the Web browser acquires Web contents provided by the Web server and the list held by the address holders from an equipment management device that corresponds to the user of the monitoring terminal among the plural equipment management devices predetermined for every user.

5. The equipment management system according to claim 1, wherein each of the plural equipment management devices further comprises operating-state-data holders that hold information about the operating state of the equipment managed by each of the equipment management devices; and the Web browser acquires information about the operating states of each piece of equipment that is held in the operating-state-data holders from each of the plural equipment management devices based on the acquired list.

6. The equipment management system according to claim 1, further comprising:

floor-plan-data data holders that hold floor-plan data that indicate a floor-plan image of an area where the plural equipment are installed; and display-position data holders that hold display-position data that indicate display positions of the plural pieces of the equipment on the floor plan; wherein the Web browser acquires the floor-plan data held by the floor-plan-data holders, and the display-position data held by the display-position-data holders, and displays the one screen in which icons corresponding to each of the plural pieces of equipment are disposed at the position indicated by the display-position data on the floor-plan indicated by the floor-plan data.

7. The equipment management system according to claim 6, wherein the icon indicates the operating state of the corresponding equipment.

8. The equipment management system according to claim 1, wherein each of the plural equipment management devices further comprises data updaters that send changed data to other equipment management devices when a change occurred in the data internally held by each of the plural equipment management devices.

9. An equipment management device comprising:

address holders; and a Web server, wherein:

the equipment management device manages equipment and connects to a monitoring terminal by a WebSocket method;

the address holders hold a list of addresses of other equipment management devices;

the Web server provides to the monitoring terminal Web contents that include:

a screen-configuration file that indicates the configuration of one screen, and a monitoring program that monitors the state of equipment managed by the equipment management device and managed by each of the other equipment management devices;

the monitoring program further:

sends a request, from the monitoring terminal to the equipment management device, to acquire the list that is held by the address holders, acquires the list held by the address holders from the equipment management device, connects to each of the other equipment management devices based on the acquired list, acquires information about the states of the equipment based on the acquired list from each of the other equipment management devices, and displays in the monitoring terminal the acquired information about the states of the equipment on one screen disposed according to the screen configuration indicated by the screen-configuration file; and the equipment management device, upon receipt of the request from the monitoring terminal, sends the list to the monitoring terminal.

10. An equipment management method comprising:

holding, by address holders in an equipment management device that manages equipment, connects to a monitoring terminal by a WebSocket method, and further comprises a Web server, a list of addresses of other equipment management devices;

providing to the monitoring terminal, by the Web server, Web contents that include:

a screen-configuration file that indicates the configuration of one screen, and a monitoring program for monitoring the state of equipment managed by the equipment management device and managed by each of the other equipment management devices, the monitoring program further:

sending a request, from the monitoring terminal to the equipment management device, to acquire the list held by the address holders, acquiring the list held by the address holders from the equipment management device, connecting to each of the other equipment management devices based on the acquired list, acquiring information about the states of the equipment based on the acquired list from each of the other equipment management devices, and displaying in the monitoring terminal the acquired information about the states of the equipment on one screen disposed according to the screen configuration indicated by the screen-configuration file; and upon receipt of the request from the monitoring terminal, sending, by the equipment management device, the list to the monitoring terminal.

11. A non-transitory computer readable medium comprising instructions for execution by a processor, the instructions implementing an equipment management method comprising:

holding, by address holders in an equipment management device that manages equipment, connects to a monitoring terminal by a WebSocket method, and further comprises a Web server and the processor, a list of addresses of other equipment management devices;

providing to the monitoring terminal, by the Web server, Web contents that include:

screen-configuration file that indicates the configuration of one screen, and a monitoring program for monitoring the state of equipment managed by the equipment management device and managed by the other equipment management devices, the monitoring program further:

sending a request, from the monitoring terminal to the equipment management device, the list held by the address holders, acquiring the list held by the address holders from the equipment management device, connecting to each of the other equipment management devices based on the acquired list, acquiring information about the states of the equipment based on the acquired list from each of the other equipment management devices, and displaying in the monitoring terminal the acquired information about the states of the equipment on one screen disposed according to the screen configuration indicated by the screen-configuration file; and upon receipt of the request from the monitoring terminal, sending by the equipment management device, the list to the monitoring terminal.

* * * * *